United States Patent
Lam et al.

(10) Patent No.: US 7,343,569 B1
(45) Date of Patent: *Mar. 11, 2008

(54) APPARATUS AND METHOD FOR RESET DISTRIBUTION

(75) Inventors: John Lam, Union City, CA (US); Arch Zaliznyak, San Jose, CA (US); Chong Lee, San Ramon, CA (US); Rakesh Patel, Cupertino, CA (US); Vinson Chan, Fremont, CA (US)

(73) Assignee: Altera Corporation, San Jose, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 11/351,425

(22) Filed: Feb. 10, 2006

Related U.S. Application Data

(63) Continuation of application No. 10/621,074, filed on Jul. 15, 2003, now Pat. No. 7,028,270.

(51) Int. Cl.
*G06F 17/50* (2006.01)
(52) U.S. Cl. ................. 716/1; 716/16; 716/17
(58) Field of Classification Search .............. 716/1, 716/16, 17; 375/354
See application file for complete search history.

(56) References Cited

U.S. PATENT DOCUMENTS

| 4,059,842 | A | 11/1977 | Meacham |
|---|---|---|---|
| 4,983,857 | A | 1/1991 | Steele |
| 5,379,302 | A | 1/1995 | Andrews |
| 5,652,529 | A | 7/1997 | Gould et al. |
| 6,580,776 | B2 | 6/2003 | Chang et al. |
| 6,650,140 | B2 | 11/2003 | Lee et al. |
| 2001/0033188 | A1 | 10/2001 | Aung et al. |

OTHER PUBLICATIONS

U.S. Appl. No. 10/059,014, filed Jan. 29, 2002, Lee et al.

*Primary Examiner*—Sun James Lin
(74) *Attorney, Agent, or Firm*—Ropes & Cray LLP; Brian E. Mack

(57) ABSTRACT

A skew-tolerant, glitch-free reset distribution apparatus and method are provided in an intellectual property (IP) block that supports a multi-channel input/output protocol. During reset mode, synchronizers are used to create more predictable timing, to pipeline the propagation delay, and to tolerate RC-induced skews of up to a clock period in routing a reset signal to all the channels and within the channels in an IP block. Two control signals, which are available from programmable logic resource core circuitry, are used to control the input of the reset signal into the IP block. Because the control signals are designed to be glitch-free, the reset signal is therefore also glitch-free, thus preventing the IP block from inadvertently transitioning into or out of reset mode.

26 Claims, 8 Drawing Sheets

APPARATUS AND METHOD FOR RESET
DISTRIBUTION

CROSS REFERENCE TO RELATED APPLICATION

This is a continuation of commonly-assigned U.S. patent application Ser. No. 10/621,074, filed Jul. 15, 2003, now U.S. Pat. No. 7,028,270.

BACKGROUND OF THE INVENTION

This invention relates to reset signals. More particularly, this invention relates to routing reset signals throughout an intellectual property (IP) block during the same clock cycle.

Programmable logic resource technology is well known for its ability to allow a common hardware design (embodied in an integrated circuit) to be programmed to meet the needs of many different applications. Known examples of programmable logic resource technology include programmable logic devices (PLDs) and field programmable gate arrays (FPGAs).

To facilitate the use of programmable logic resources in certain applications, intellectual property (IP) blocks are coupled to programmable logic resource core circuitry. In one application, an IP block is a block of logic or data that supports a multi-channel input/output protocol such as high speed serial interface (HSSI) communications. HSSI communications includes industry standards such as, for example, XAUI, InfiniBand, 1G Ethernet, FibreChannel, Serial RapidIO, and 10G Ethernet. In a multi-channel input/output protocol, data transfers to and from programmable logic resource core circuitry and an IP block over multiple channels. For example, for the 10GBASE-X standard, which has a throughput of 10 Gigabits per second, the IP block has four channels that support data transfers of up to 2.5 Gigabits per second through each channel.

A reset signal, which can be asynchronous or synchronous, is typically routed to a central block where the reset signal goes through some reset logic and then fans out to all the channels in the IP block. When programmable logic resource core circuitry is coupled to the IP block, the programmable logic resource core circuitry sends the reset signal and other control signals to the IP block. The control signals direct the operation of the reset logic in order to conserve power during non-operational periods.

Several problems often arise with known methods of routing reset signals. The use of an asynchronous reset signal can cause different channels, or different blocks within the same channel, to come in or out of reset during different clock cycles. For example, an asynchronous reset signal that is sent to the IP block towards the end of a clock cycle may not get routed to all the channels by the end of that clock cycle. The use of an asynchronous reset signal limits the amount of time available for the signal to be routed to all the channels.

Resistance-Capacitance (RC) skew can cause additional delays in the routing of the reset signal to all the channels. RC is a time constant that refers to the time for a signal to travel between two locations. The longer the interconnect line from the central block to a channel in the IP block, the greater the propagation delay in the interconnect line, and the larger the RC skew. Further RC skews can be introduced in the distribution of the reset signal to different blocks within each channel. As a result, RC skew can lead to different channels, or different blocks within the same channel, coming in or out of reset during different clock cycles.

When the IP block is coupled with programmable logic resource core circuitry, the IP block needs to be in reset mode when the programmable logic resource is in the power-up or programming phases. The reset logic in the IP block is therefore typically controlled by control signals and/or configuration bits (e.g., configuration random access memory) from the programmable logic resource core circuitry. However, the control signals and/or configuration bits are vulnerable to glitches, which sometimes cause the reset logic to inadvertently enter or exit reset mode. A glitch is an unstable signal that makes a false transition (e.g., a signal that is supposed to be a binary "0" changes to a binary "1" before changing back to binary "0"). A glitch can occur due to racing between control signals during power-up or due to unstable configuration bits during programming. Racing occurs when two signals that originate from the same location propagate through different paths at different speeds.

As clock speeds continue to increase with newer technology, the issue of skew becomes more significant. The smaller the clock period, the more difficult it becomes to ensure that an entire IP block gets reset within the same clock cycle. In addition, because control signals and/or configuration bits from the programmable logic resource core circuitry are used to control the reset logic in the IP block, the problem of glitching continues to be a problem.

In view of the foregoing, it would be desirable to provide a skew-tolerant, glitch-free reset distribution apparatus and method for an IP block that supports a multi-channel input/output protocol.

SUMMARY OF THE INVENTION

In accordance with the invention, a skew-tolerant, glitch-free reset distribution apparatus and method are provided in an Intellectual Property (IP) block that supports a multi-channel input/output protocol. During reset mode, synchronizers are used to create more predictable timing, to pipeline the propagation delay, and to tolerate RC-induced skews of up to a clock period in routing the reset signal to all the channels and within the channels in the IP block. Two control signals, which are available from the programmable logic resource core circuitry, are used to control the input of the reset signal into the reset logic in the IP block. Because the control signals are designed to be glitch-free, the reset signal is also glitch-free. As a result, the reset logic is prevented from inadvertently entering or exiting reset mode.

The reset logic includes combinatorial logic, a central block having one or more synchronizers and logic gates, and one or more synchronizers in each channel. A reset signal is sent as input to the combinatorial logic which outputs pairs of reset signals. A pair of reset signals, which includes a transmitter reset signal and a receiver reset signal, is generated for each channel in the IP block.

Each pair of reset signals is sent to synchronizers in the central block. A synchronizer includes two flip-flops, where the output of a first flip-flop is sent as input to a second flip-flop. The synchronizers for the transmitter reset signals and the synchronizers for the receiver reset signals are controlled either by the same clock or by different clocks. Each synchronized transmitter reset signal is input to a logic gate (e.g., an "OR" gate, a "NOR" gate), or a combination of logic gates, that outputs a single transmitter reset signal. Similarly, each synchronized receiver reset signal is input to another logic gate (e.g., an "OR" gate, a "NOR" gate), or combination of logic gates, that outputs a single receiver reset signal. When any one of the synchronized transmitter or receiver reset signals is binary "1," the respective logic gate outputs a binary "1" (which indicates a reset mode). The synchronizers in the central block pipelines the propagation delay of the reset signals to allow the single transmitter reset signal and the single receiver reset signal a full clock cycle to be routed from the synchronizers in the central block to each of the channels.

The outputs of the logic gates are routed to synchronizers in each channel. Similar to the synchronizers in the central block, the synchronizers for the transmitter reset signal and the synchronizers for the receiver reset signal are controlled either by the same clock or by different clocks. These synchronizers give the transmitter and the receiver reset signal in each channel one full clock cycle in which to propagate throughout the channel.

In addition to providing skew-tolerant reset logic, the reset logic is also made to be glitch-free. The operation of the reset logic is controlled using two signals from the programmable logic resource core circuitry: a power-on-reset (NPOR) signal and a programming done (PROG_DONE) signal. The NPOR signal stays low (e.g., binary "0") until the supply voltage reaches a predetermined voltage level. The PROG_DONE signal stays low until all the configuration bits in the programmable logic resource have been programmed. The reset signal from the programmable logic resource core circuitry is allowed to be input to the IP block's reset logic when both the NPOR and PROG_DONE signals are both set high (e.g., binary "1"). The NPOR and PROG_DONE signals are designed and laid out in a way as to be glitch-free, thereby preventing the reset logic from inadvertently entering or exiting reset mode.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
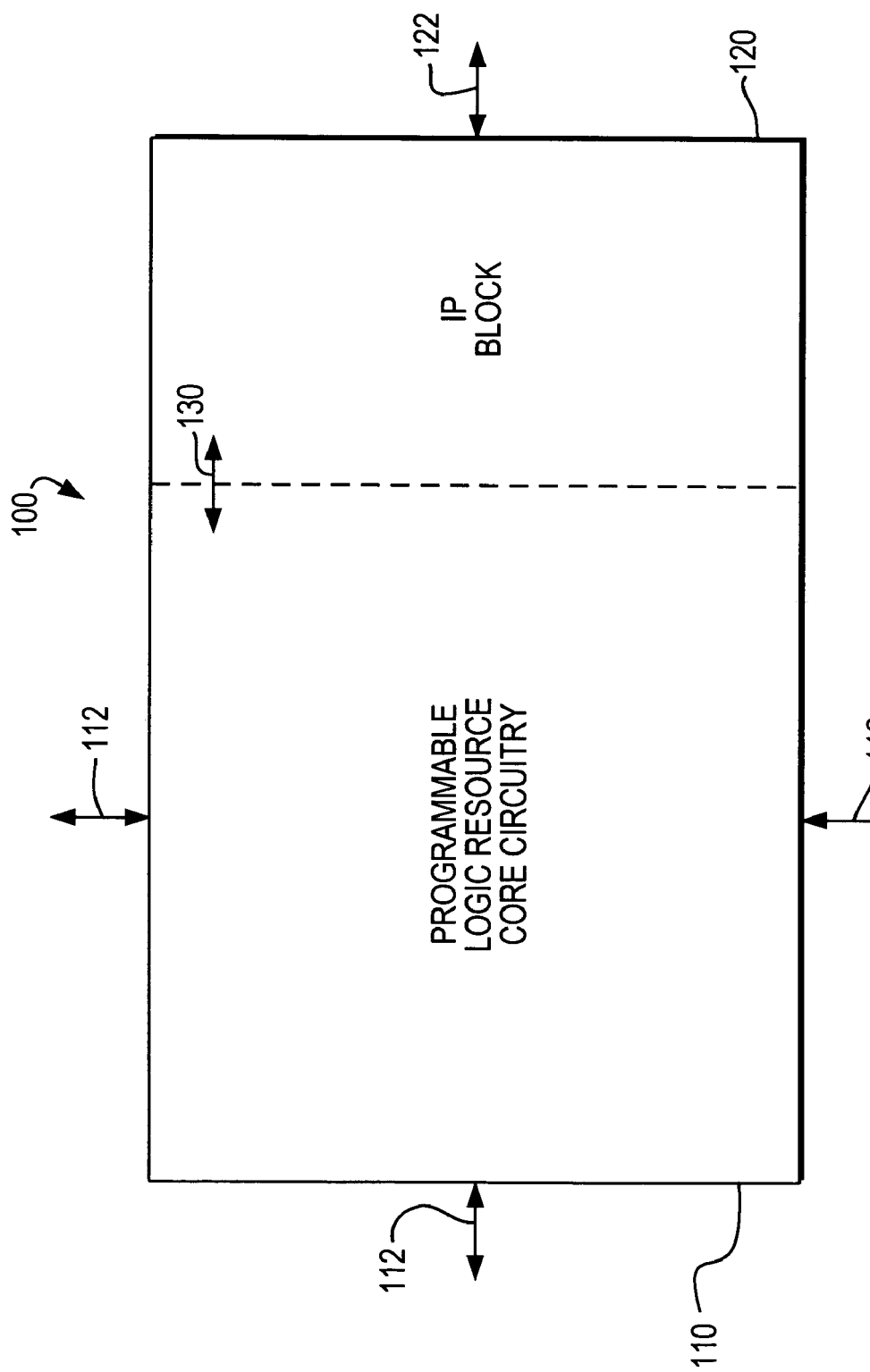
FIG. 1 is a simplified block diagram of an illustrative embodiment of a programmable logic resource.

An illustrative programmable logic resource 100 constructed in accordance with the invention is shown in FIG. 1. Programmable logic resource 100 is an integrated circuit that includes programmable logic resource core circuitry 110 and an intellectual property (IP) block 120. Programmable logic resource core circuitry 110 can be typical programmable logic circuitry of any of several known types and constructions. In accordance with this invention, IP block 120 supports, for example, a multi-channel input/output protocol such as high speed serial interface ("HSSI") circuitry. HSSI circuitry includes various HSSI circuit components that are hard-wired (at least to a large extent) and are therefore dedicated to performing various functions required to implement HSSI operations. The HSSI circuitry is used to receive one or more high speed serial ("HSS") signals via connection(s) 122 and to pass the information thus received on to programmable logic resource core circuitry 110 in a form that is more readily usable by the core circuitry. Alternatively or additionally, IP block 120 can be used to output via connection(s) 122 one or more signals indicative of information received from programmable logic resource core circuitry 110. Leads 130 are used to convey signals between programmable logic resource core circuitry 110 and IP block 120. Programmable logic resource core circuitry 110 can also input and/or output other, typically non-IP block, signals via leads 112.

For clarity, the invention is described primarily in the context of IP block 120 having HSSI circuitry. The principles of this invention are applicable to many HSSI communication standards, and therefore to many types of HSSI circuitry. The illustrative HSSI standards that the illustrative circuitry shown herein support include, for example, the standards known as XAUI, InfiniBand, 1G Ethernet, Fibre-Channel, Serial RapidIO, 10G Ethernet, and many non-industry-standard protocols that are modifications of the true industry-standard protocols. Some users may sometimes want to devise and employ such variants of industry standards, and many such variants can be supported by the circuitry of this invention.

The 10G Ethernet, for example, has three different implementations including the 10GBASE-X, 10 GBASE-R, and 10GBASE-W. The 10GBASE-X, which has a throughput of 10 Gigabits per second (Gbps), sends data over four channels at a speed of at least 2.5 Gbps through each channel. The 10GBASE-X can support the XAUI interface which uses 8 bit/10 bit (8b/10b) encoding. In this protocol, an 8-bit word stream is encoded to 10-bit word streams, thereby increasing the throughput of each channel up to 3.125 Gbps. In the illustrative embodiment shown herein, the 10GBASE-X interface may be fully implementable in IP block 120. For some of the other standards, part of the interface may be implemented in IP block 120 and part of the interface may be implemented in programmable logic resource core circuitry 110.

Figure 2:
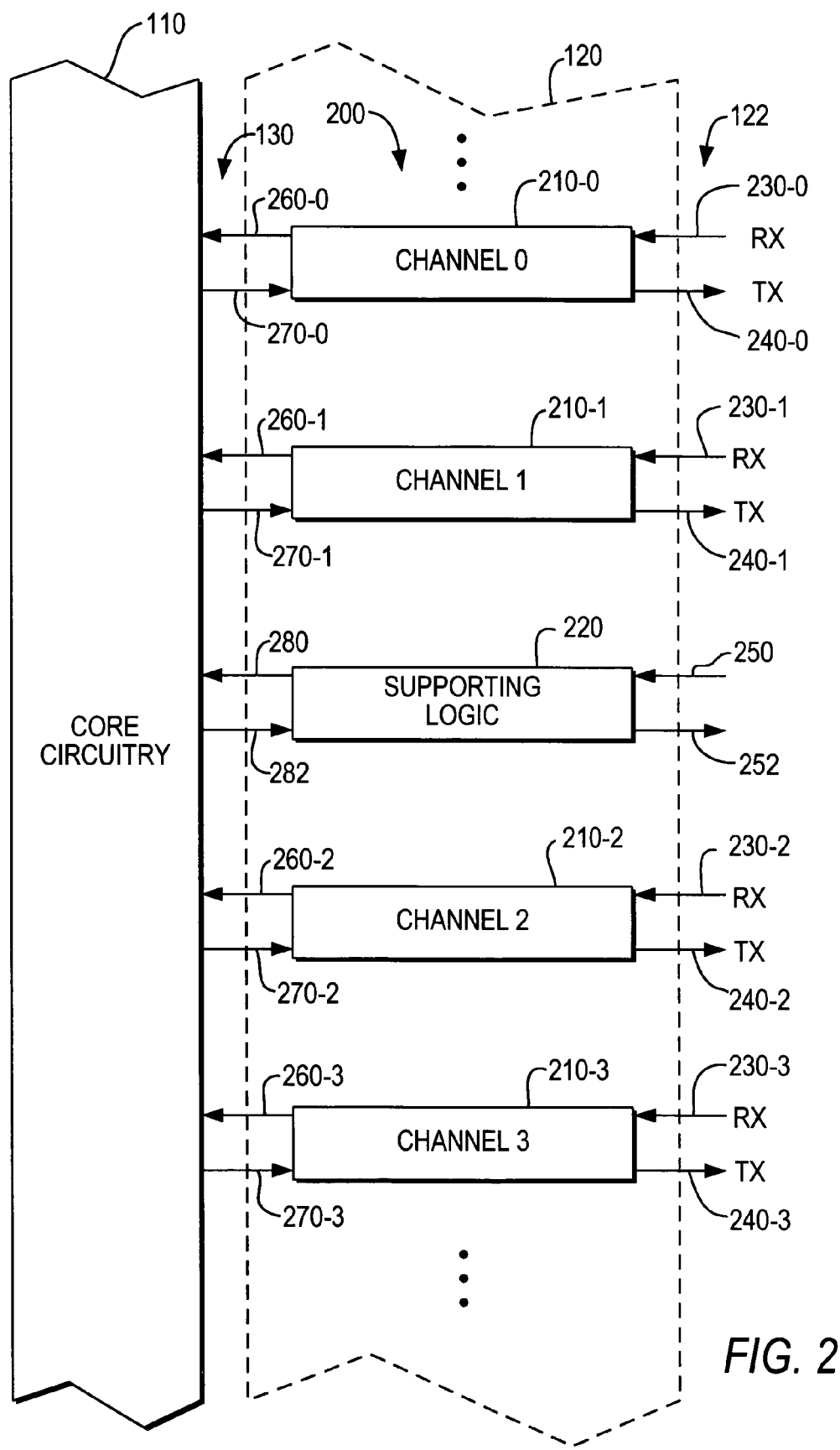
FIG. 2 is a more detailed, but still simplified schematic block diagram of a representative portion of the circuitry shown in FIG. 1.

Because 10 GBASE-X is a four-channel standard, IP block 120 is basically organized into one or more "quads" of four channels each. For clarity, the invention is primarily described herein as implementing the 10GBASE-X protocol which supports four channels, although the invention can be implemented using other suitable protocols having other suitable numbers of channels with different throughputs. As shown in FIG. 2, a representative quad 200 includes four data channels 0-3 (also identified as 210-0 through 210-3) and a supporting logic circuit 220. Each data channel 210 receives one data stream from external circuitry via associated receiver (RX) signal 230 and/or transmits to external circuitry one data stream via associated transmitter (TX) signal 240. Each channel 210 includes the circuitry required to at least partly convert a received signal to a form more suitable for application to programmable logic resource core circuitry 110 via associated leads 260. For example, each channel 210 can receive successive serial bytes of 10 bits each (because of 8B/10B encoding) and can output to programmable logic resource core circuitry 110 successive parallel bytes of 8 bits each. Each channel 210 also includes the circuitry required to at least partly convert signals received from programmable logic resource core circuitry 110 via leads 270 to a form more suitable for application to external circuitry. For example, each channel 210 can receive successive parallel bytes of 8 bits each and can output as transmitter signal 240 successive serial bytes of 10 bits each.

Although not shown, each data channel 210 receives and/or outputs one data stream via associated drivers. To avoid overcomplicating the drawing, the data streams are shown as being sent over RX signals 230 and TX signals 240. Each driver can be a differential driver because the HSSI standards of interest in connection with the present illustrative embodiment receive and transmit information using differential signaling. Each receiver driver has an associated pair of input pins and each transmitter driver has an associated pair of output pins that couple to a receiver and a transmitter circuit, respectively. The transmitter circuits may include, for example, first-in first-out (FIFO) circuits, serializers, and 8B10B encoders. The receiver circuits may include, for example, FIFO circuits, deserializers, 8B10B decoders, and byte alignment circuits.

Circuit 220, which is included in each quad 200, includes circuitry that is usable to support certain operations in all four of the associated data channels. For example, a phase-locked loop (PLL) circuit receiving a reference clock (REF-CLK) signal can be used to produce candidate recovered clock signals for use by each channel 210 in that channel's operations to produce a final recovered clock signal from a clock data recovery (CDR) signal received by that channel 210. As another example, because certain HSS standards allow "skew" between received data channels, circuit 220 includes circuitry for determining how much the four channels of received HSS data are skewed relative to one another as part of the operations required to compensate for such skew. Circuit 220 can receive REFCLK signals via signals 250 and/or 252, and can communicate with programmable logic resource core circuitry 110 via leads 280 and/or 282.

In accordance with the invention, a skew-tolerant, glitch-free reset distribution apparatus and method are provided in IP block 120. During reset mode, synchronizers are used to create more predictable timing, to pipeline the propagation delay, and to tolerate RC-induced skews of up to a clock period in routing a reset signal to all the channels and within the channels in IP block 120. Two control signals, which are available from programmable logic resource core circuitry 110, are used to control the input of the reset signal into IP block 120. Because the control signals are designed to be glitch-free, the reset signal is therefore also glitch-free, thus preventing IP block 120 from inadvertently entering or exiting reset mode.

Reset logic includes combinatorial logic, a central block having one or more synchronizers and logic gates, and one or more synchronizers in each channel. A reset signal is sent as input to the combinatorial logic which outputs pairs of reset signals. A pair of reset signals, which typically includes a transmitter reset signal and a receiver reset signal, is generated for each channel in the IP block.

Each pair of reset signals is sent to synchronizers in the central block. A synchronizer includes two flip-flops, where the output of a first flip-flop is sent as input to a second flip-flop. The synchronizers for the transmitter reset signals and the receiver reset signals are controlled either by a same clock or by different clocks. Each synchronized transmitter reset signal is input to a logic gate (e.g., an "OR" gate, a "NOR" gate), or a combination of logic gates, that outputs a single transmitter reset signal. Similarly, each synchronized receiver reset signal is input to another logic gate (e.g., an "OR" gate, a "NOR" gate), or combination of logic gates, that outputs a single receiver reset signal. The synchronizers in the central block pipeline the propagation delay of the reset signals to allow the signals a full clock cycle to be routed from the synchronizers in the central block to each of the channels.

The outputs of the logic gates are then routed to synchronizers in each channel. Similar to the synchronizers in the central block, the synchronizers for the transmitter reset signal and the receiver reset signal are controlled either by the same clock or by different clocks. These synchronizers give the reset signals in each channel one full clock cycle in which to propagate throughout the channel.

In addition to providing skew-tolerant reset logic, the reset logic is also made to be glitch-free. The operation of the reset logic is controlled using two signals from programmable logic resource core circuitry 110: a power-on-reset (NPOR) signal and a programming done (PROG_DONE) signal. The NPOR signal stays low (e.g., binary "0") until the supply voltage reaches a predetermined voltage level. The PROG_DONE signal stays low until all the configuration bits in programmable logic resource 100 have been programmed. The reset signal from programmable logic resource core circuitry 110 is allowed to be input to IP block 120 when both the NPOR and PROG_DONE signals are high (e.g., binary "1"). The NPOR and PROG_DONE signals are designed and laid out in a way as to be glitch-free, thereby preventing IP block 120 from inadvertently entering or exiting reset mode.

Figure 3:
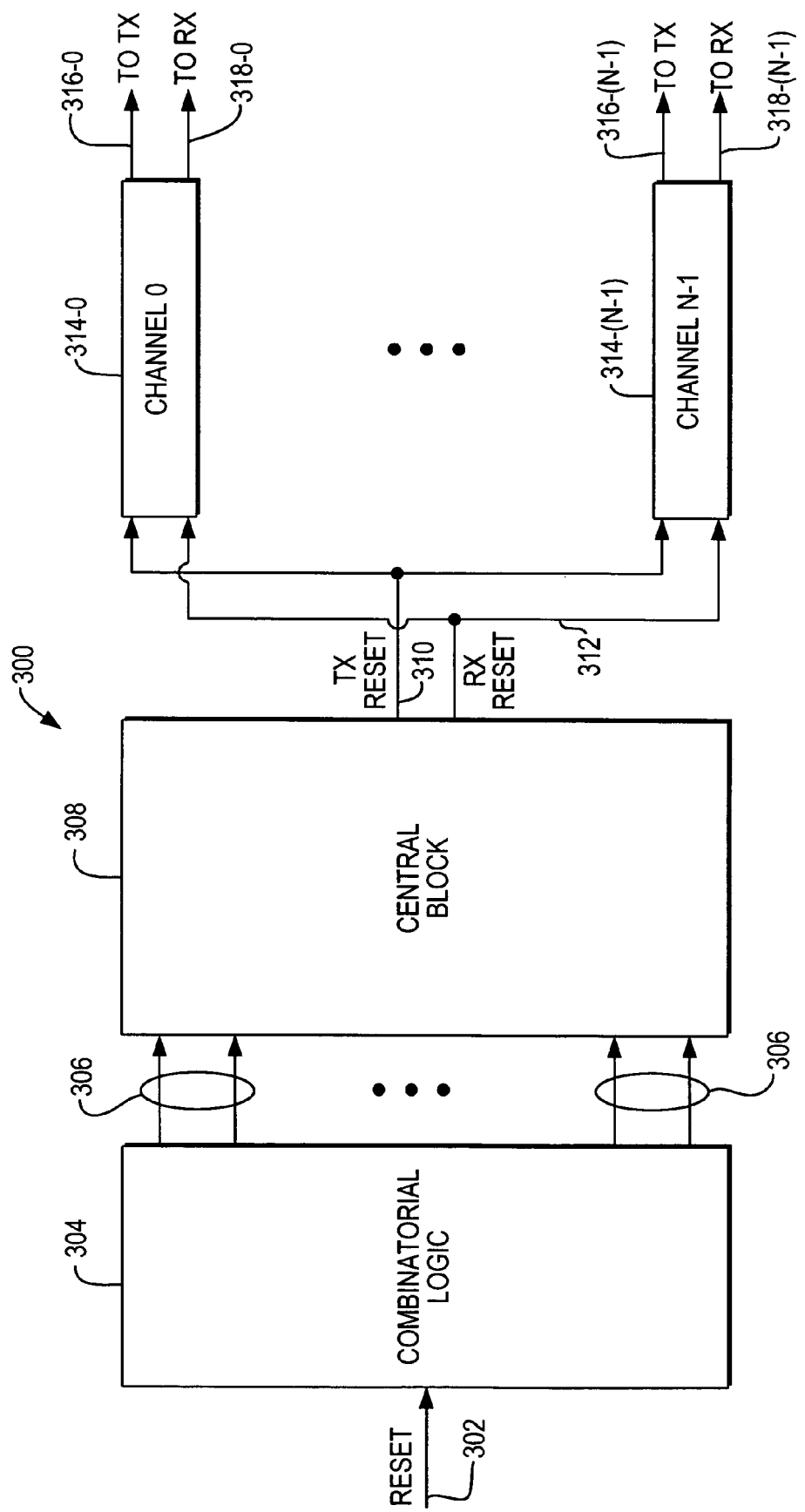
FIG. 3 is a simplified schematic block diagram of reset logic in accordance with one embodiment of the invention.

FIG. 3 is a simplified schematic block diagram of reset logic 300. Programmable logic resource core circuitry 110 sends a reset signal 302 over one of leads 130 to combinatorial logic 304 in IP block 120. Although the invention is primarily described herein in the context of reset logic 300 residing on IP block 120 for clarity, reset logic 300 can also be implemented on programmable logic resource core circuitry 110, partially on programmable logic resource core circuitry 110 and partially on IP block 120, in an interface block on programmable logic resource 100 that is external to programmable logic resource core circuitry 110 and IP block 120, or any other suitable location or combination of locations.

Figure 4:
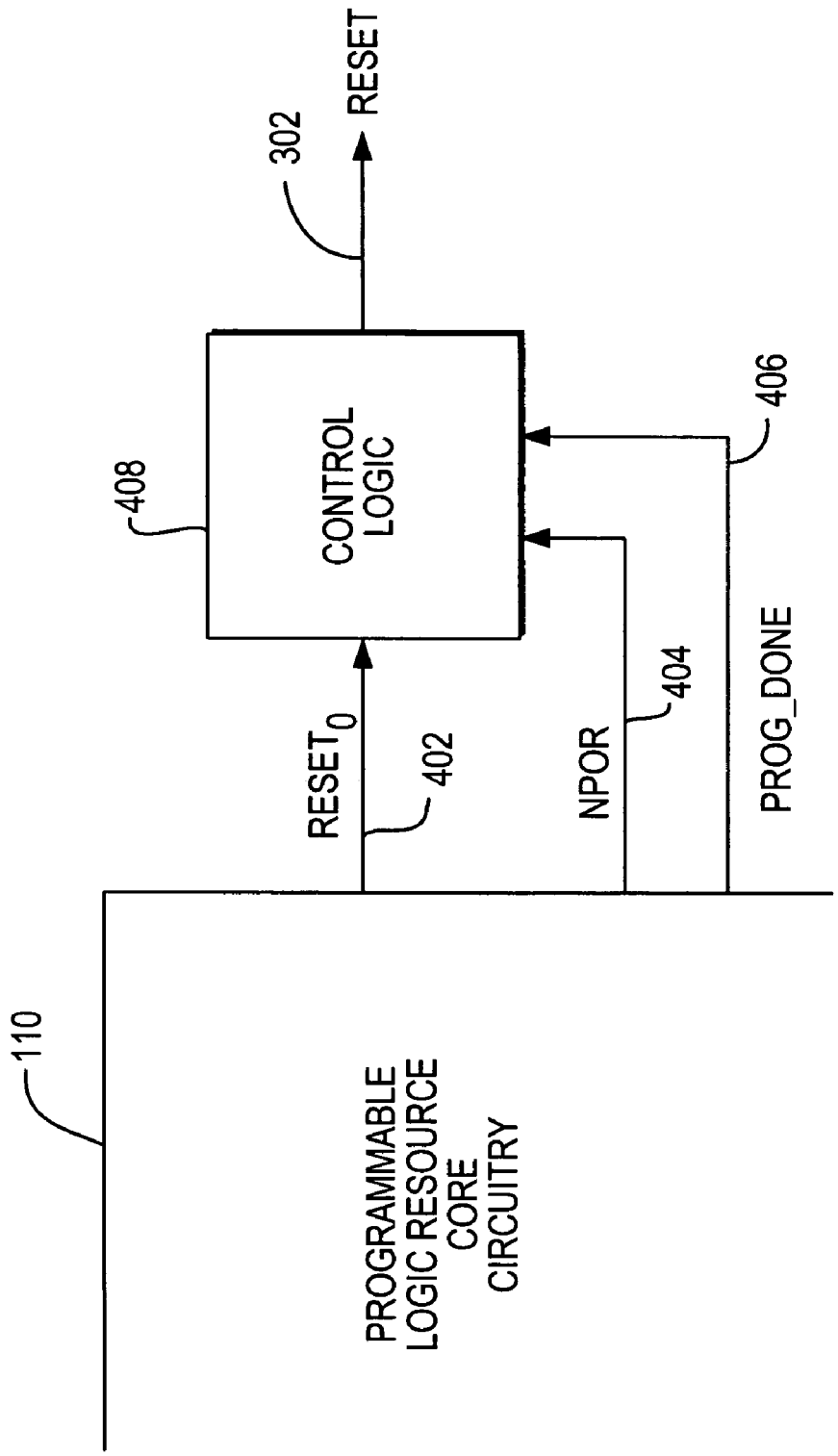
FIG. 4 is a simplified schematic block diagram of control signals used to control the reset logic shown in FIG. 3 in accordance with one embodiment of the invention.

FIG. 4 is a simplified block diagram of circuitry used to control the reset of IP block 120. In one embodiment, programmable logic resource core circuitry 110 sends three signals to control the reset of IP block 120: reset signal 402, power-on-reset (NPOR) signal 404, and program done (PROG_DONE) signal 406. Reset signal 402 can be synchronous or asynchronous. NPOR signal 404 stays low until the supply voltage reaches a predetermined voltage level. PROG_DONE signal 406 stays low until all the configuration bits in programmable logic resource 100 have been programmed. Signals 402, 404, and 406 are sent as input to control logic 408. Control logic 408 can be a logic gate, a combination of logic gates, a tristate buffer, flip-flops, or any other suitable circuitry that outputs the data on reset signal 402 when NPOR signal 404 and PROG_DONE signal 406 are both set high. For example, NPOR signal 404 and PROG_DONE signal 406 can be inputs to an AND gate. When the output of the AND gate is binary "1," reset signal 402 is allowed to pass through to the output; otherwise signal 402 is blocked. Alternatively, using complementary logic, NPOR signal 404 and PROG_DONE signal 406 can be inputs to a NAND gate whose output is sent to an inverter. Control logic 408 allows reset logic 300 to conserve power during non-operational periods and further prevents reset logic 300 from inadvertently entering or exiting reset mode due to glitching.

FIG. 4 shows signals 402, 404, and 406 as being output from programmable logic resource core circuitry 110 for clarity. In different embodiments, control logic 408 can be located in IP block 120, in programmable logic resource core circuitry 110, in an interface block on programmable logic resource 100 that is external to programmable logic resource core circuitry 110 and IP block 120, or any other suitable location. The gating of reset signal 302 can be controlled using any other suitable glitch-free signal or combination of signals from programmable logic resource core circuitry 110.

Referring back to FIG. 3, combinatorial logic 304 takes as input reset signal 302 and generates a pair of reset signals 306 corresponding to each channel 314 in IP block 120. For example, for the 10GBASE-X protocol with four channels, four pairs of reset signals 306 are generated. Each pair of reset signals 306 includes a transmitter (TX) reset signal and a receiver (RX) reset signal.

The pairs of reset signals 306 are sent as input into a central block 308 having circuitry to synchronize each transmitter reset signal and each receiver reset signal. The transmitter reset signals and the receiver reset signals are synchronized using the same clock or different clocks. Also in central block 308, the synchronized transmitter reset signals go through combinatorial logic to output a single transmitter reset signal 310. Similarly, the synchronized receiver reset signals go through combinatorial logic to output a single receiver reset signal 312.

Reset signals 310 and 312 are routed to each channel 314 in IP block 120. Each channel 314 has circuitry to synchronize reset signals 310 and 312. Reset signals 310 and 312 are synchronized using the same clock or different clocks. The synchronized reset signals in each channel are then routed throughout the channel to respective transmitter circuitry via lead 316 and receiver circuitry via lead 318, respectively.

Figure 5:
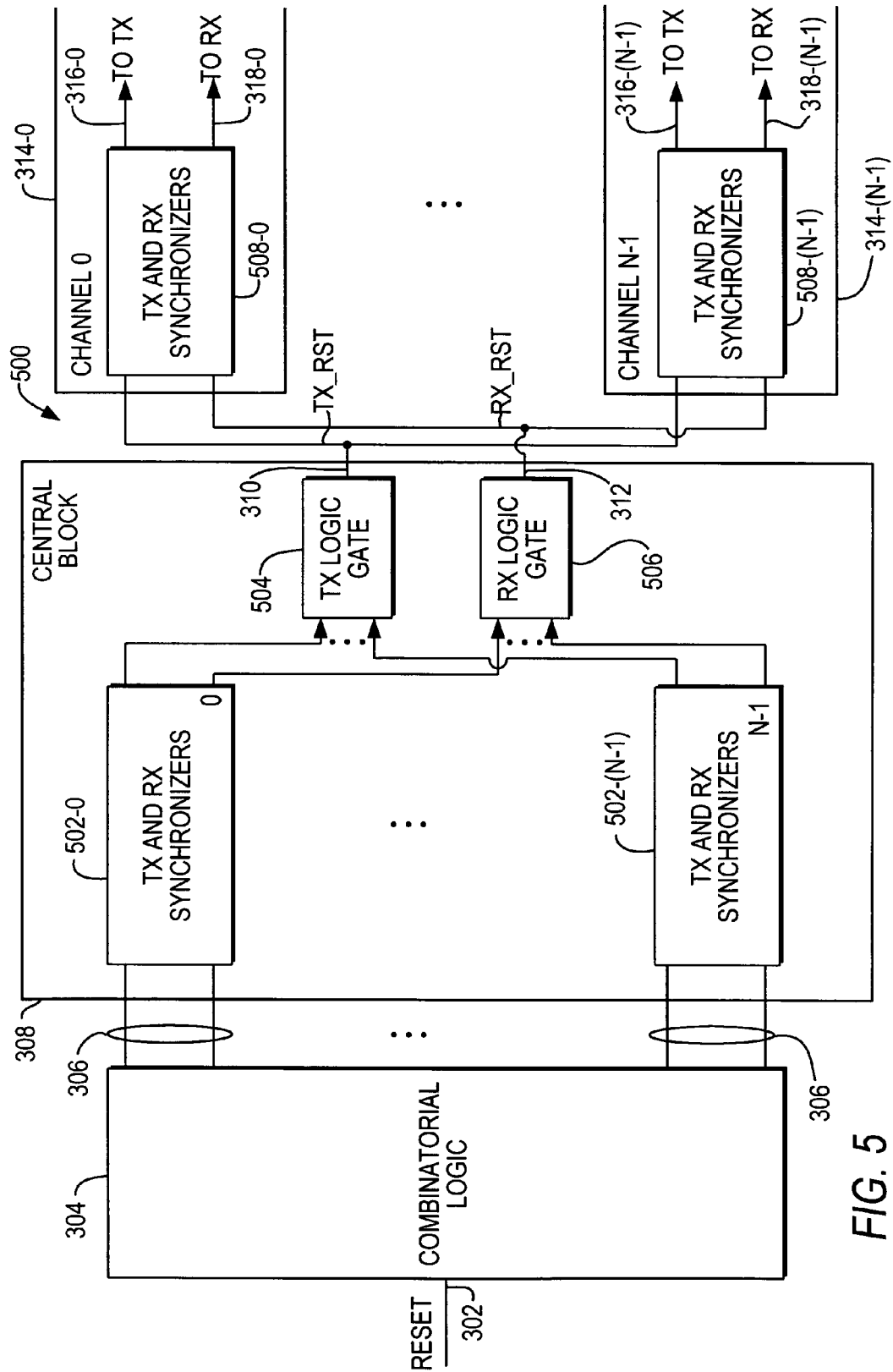
FIG. 5 is a more detailed, but still simplified schematic block diagram of the reset logic shown in FIG. 3 in accordance with one embodiment of the invention.

FIG. 5 is a more detailed, but still simplified schematic block diagram of the reset logic shown in FIG. 3. Central block 308 in reset logic 500 includes one or more transmitter and receiver synchronizer blocks 502, a transmitter logic gate 504, and a receiver logic gate 506. Each synchronizer block 502 corresponds to one channel 314 in IP block 120. Synchronizer block 502 receives a pair of reset signals 306 from combinatorial logic 304, synchronizes the pair of reset signals 306, and outputs the synchronized pair of reset signals at the beginning of their associated clock period.

Synchronizer block 502 includes any suitable circuitry and is controlled by one or more clocks. For example, synchronizer block 502 can include one synchronizer for synchronizing both the transmitter reset signal and the receiver reset signal, one synchronizer each for synchronizing the transmitter reset signal and the receiver reset signal, or any suitable combination thereof. The synchronization of the transmitter reset signal and receiver reset signal is controlled either by a same clock or by different clocks.

The synchronized transmitter reset signal from each synchronizer block 502 is sent as input to gate 504 which outputs a single transmitter reset signal 310. Similarly, the synchronized receiver reset signal from each synchronizer block 502 is sent as input to gate 506 which outputs a single receiver reset signal 312.

Gates 504 and 506 include any suitable logic gate or combination of logic gates that generates reset signals 310 and 312, respectively. A reset signal is set high (or low if complementary logic is used) when any one of the input reset signals is set high. A reset signal is set low (or high if complementary logic is used) when all of the input reset signals are set low. Gates 504 and 506 can include one or more, or a combination of, OR gates, NOR gates, inverters, or other suitable logic.

Reset signals 310 and 312 are routed to a transmitter and receiver synchronizer block 508 in each channel 314. Synchronizer blocks 508 are similar to that described in connection with synchronizer blocks 502. The synchronized transmitter reset signal from each synchronizer block 508 is sent throughout each channel 314 via lead 316 to transmitter circuitry. Similarly, the synchronized receiver reset signal from each synchronizer block 508 is sent throughout each channel 314 via lead 318 to receiver circuitry. Synchronizer block 508 can be controlled by the same clock(s) used to control synchronizer block 502 or different clocks.

Figure 6:
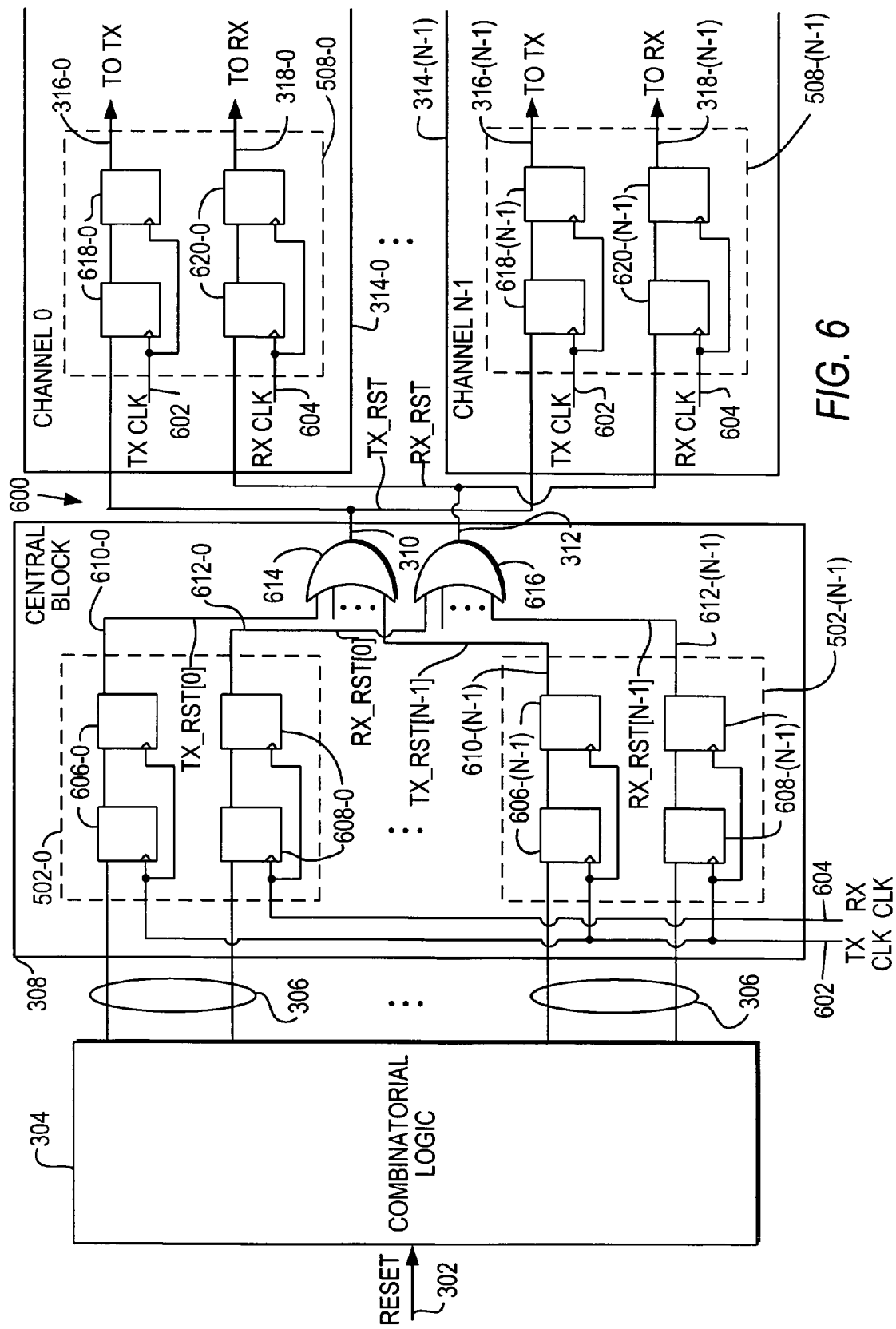
FIG. 6 is an even more detailed schematic block diagram of the reset logic shown in FIG. 5 in accordance with one embodiment of the invention.

FIG. 6 is an even more detailed schematic block diagram of the reset logic shown in FIG. 5. In one embodiment, each synchronizer block 502 and 508 in reset logic 600 includes a synchronizer for transmitter reset signals and a synchronizer for receiver reset signals. In synchronizer blocks 502 and 508, a transmitter synchronizer includes pairs of flip-flops 606 and 618, respectively, where the output of a first flip-flop is the input of the second flip-flop. A flip-flop is a sequential device that samples its input and changes its output based on a clocking signal. Pairs of flip-flops 606 and 618 are controlled by a transmitter clock 602. Also in synchronizer blocks 502 and 508, a receiver synchronizer includes pairs of flip-flops 608 and 620, respectively, where the output of a first flip-flop is the input of the second flip-flop. Pairs of flip-flops 608 and 620 are controlled by a receiver clock 604. Clocks 602 and 604 may have the same clocking domain or a different clocking domain, and may sample its inputs at a rising edge, a falling edge, or both a rising and falling edge of clocks 602 and 604, respectively.

In central block 308, the input of a first flip-flop in each pair of flip-flops 606 and 608 receives a transmitter reset signal and a receiver reset signal, respectively, from combinatorial logic 304. The use of pairs of flip-flops 606 and 608 synchronizes the reset signals to make their timings more predictable and also pipelines the propagation delay. A synchronized transmitter reset signal 610 and a synchronized receiver reset signal 612 are output from the second flip-flop in each pair of flip-flops 606 and 608, respectively, at the beginning of a clocked period, thus enabling the signals a full clock cycle in order to reach all the channels 314.

Each synchronized transmitter reset signal 610 is input to a first OR gate 614, which is part of logic gate 504. Each synchronized receiver reset signal 612 is input to a second OR gate 616, which is part of logic gate 506. OR gates 614 and 616 can each be a single N-input (where N represents the number of synchronizer blocks 502) OR gate or a cascade of smaller OR gates (e.g., 2-input OR gates, 3-input OR gates, other suitable number of input OR gates, or any combination of the same). When any of the synchronized transmitter reset signals 610 or synchronized receiver reset signals 612 is a binary "1" (which may indicate a reset command), the output will be binary "1." The output of OR gate 614 is a single transmitter reset signal 310 that is routed to synchronizer block 508 in each channel 314. The output of OR gate 616 is a single receiver reset signal 312 that is also routed to synchronizer block 508 in each channel 314.

In channels 314, the input of a first flip-flop in each pair of flip-flops 618 and 620 receives signals 310 and 312, respectively, from central block 308. The use of pairs of flip-flops 618 and 620 further synchronizes the reset signals to make their timings predictable and pipelines the propagation delay. Reset signals 316 and 318 are output from the second flip-flop in each pair of flip-flops 618 and 620, respectively, at the beginning of a clocked period, thus enabling the signals a full clock cycle in order be routed throughout all the channels 314 to respective transmitter and receiver circuitry.

Figure 7:
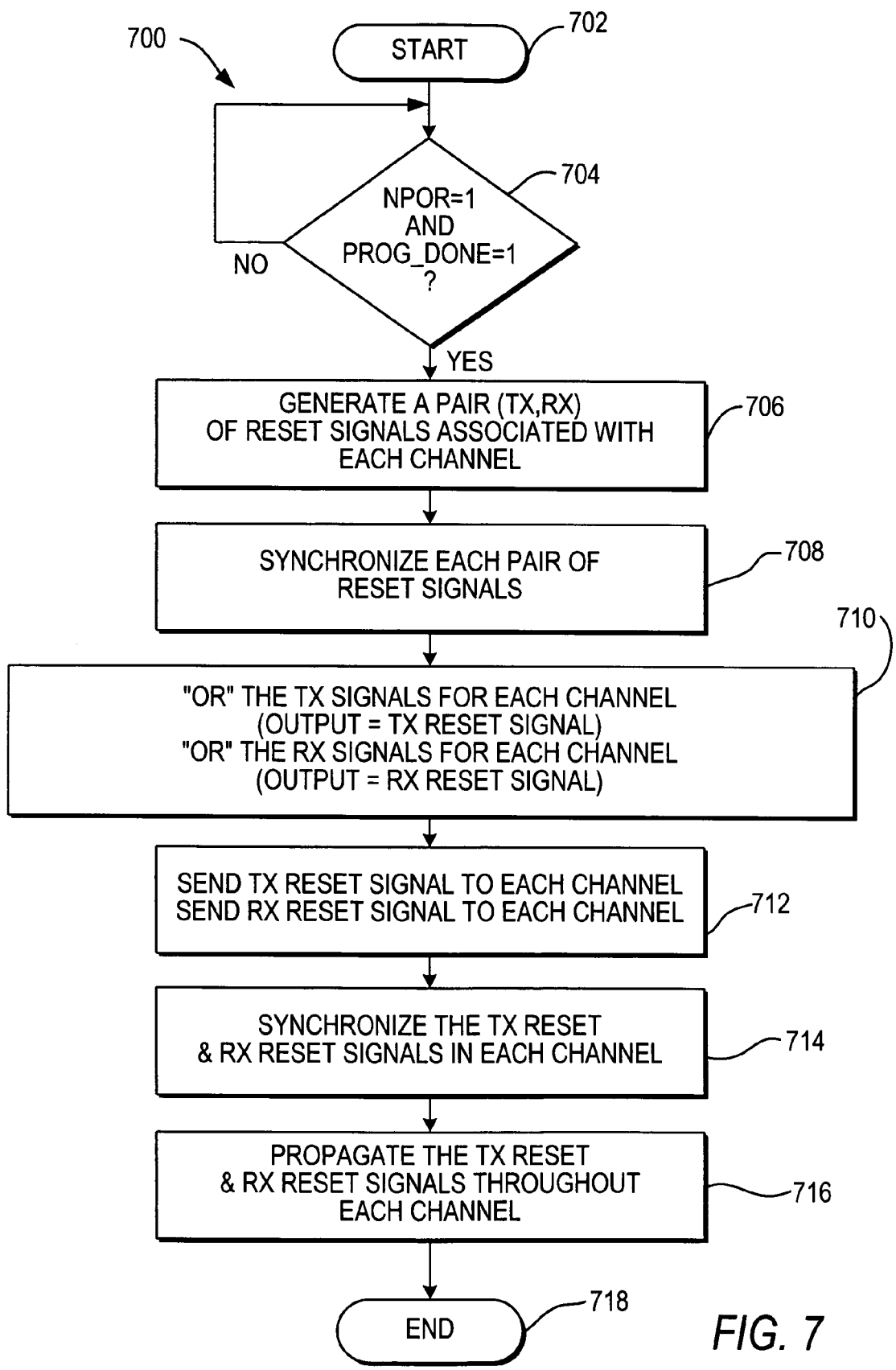
FIG. 7 is an illustrative flow diagram of the reset logic in accordance with one embodiment of the invention.

FIG. 7 is an illustrative flow diagram 700 of one embodiment of the reset logic. Process 700 begins at step 702. At step 704, process 700 determines whether two control signals from programmable logic resource core circuitry 110, power-on-reset (NPOR) signal 404 and program done (PROG_DONE) signal 406, are both set high (e.g., binary "1"). If both signals are not set high, process 700 returns to step 704. If both signals are set high, process 700 moves to step 706 where reset signal 302 is sent into combinatorial logic 304 to generate a pair of reset signals 306 associated with each channel. At step 708, the pairs of reset signals 306 are synchronized. Next at step 710, the synchronized transmitter reset signals go through combinatorial logic to output a single transmitter reset signal 310 and the synchronized receiver reset signals go through combinatorial logic to output a single receiver reset signal 312. Process 700 then moves to step 712 where reset signals 310 and 312 are routed to each channel. Signals 310 and 312 are then synchronized at step 714. At step 716, the newly synchronized reset signals 316 and 318 are propagated throughout each channel to respective transmitter and receiver circuitry. Process 700 then ends at step 718.

Figure 8:
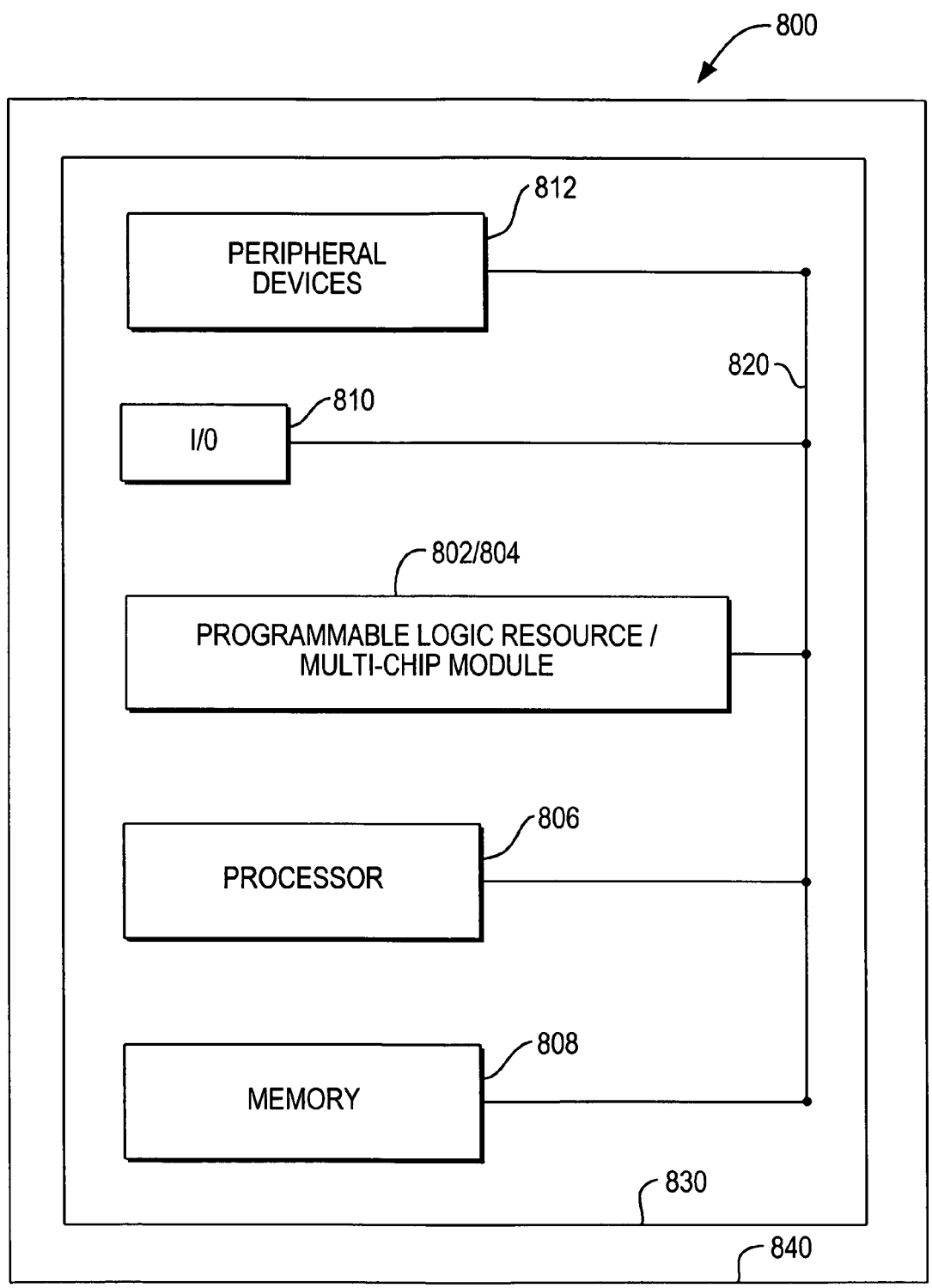
FIG. 8 is a simplified schematic block diagram of an illustrative system employing a programmable logic resource in accordance with the invention.

FIG. 8 illustrates a programmable logic resource 802 or multi-chip module 804 which includes embodiments of this invention in a data processing system 800. Data processing system 800 can include one or more of the following components: a processor 806, memory 808, I/O circuitry 810, and peripheral devices 812. These components are coupled together by a system bus or other interconnections 820 and are populated on a circuit board 830 which is contained in an end-user system 840.

System 800 can be used in a wide variety of applications, such as computer networking, data networking, instrumentation, video processing, digital signal processing, or any other application where the advantage of using programmable or reprogrammable logic is desirable. Programmable logic resource/module 802/804 can be used to perform a variety of different logic functions. For example, programmable logic resource/module 802/804 can be configured as a processor or controller that works in cooperation with processor 806. Programmable logic resource/module 802/804 may also be used as an arbiter for arbitrating access to a shared resource in system 800. In yet another example, programmable logic resource/module 802/804 can be configured as an interface between processor 806 and one of the other components in system 800. It should be noted that system 800 is only exemplary, and that the true scope and spirit of the invention should be indicated by the following claims.

Various technologies can be used to implement programmable logic resources 802 or multi-chip modules 804 having the features of this invention, as well as the various components of those devices (e.g., programmable logic connectors ("PLCs") and programmable function control elements ("FCEs") that control the PLCs). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMs, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferroelectric memories, fuses, antifuses, or the like. From the various examples mentioned above it will be seen that this invention is applicable to both one-time-only programmable and reprogrammable resources.

Thus it is seen that skew-tolerant, glitch-free reset distribution logic is provided for an IP block that supports a multi-channel I/O protocol. One skilled in the art will appreciate that the invention can be practiced by other than the prescribed embodiments, which are presented for purposes of illustration and not of limitation, and the invention is limited only by the claims which follow.

What is claimed is:

1. A programmable logic resource having programmable logic resource circuitry that provides a reset signal to an intellectual property block that supports a multi-channel input/output protocol comprising:
   first circuitry operative to receive as input the reset signal and to generate as output a plurality of pairs of reset signals; and
   a plurality of channels in the intellectual property block each comprising second circuitry operative to receive one of the plurality of pairs of reset signals and to synchronize the plurality of pairs of reset signals for output in a respective one of the plurality of channels.

2. The programmable logic resource of claim 1 wherein the first circuitry comprises control logic that receives as input a first signal, a second signal, and the reset signal, and is operative to send as output the reset signal when (1) the first signal is set indicating a supply voltage on the programmable logic resource circuitry has reached a predetermined voltage level and (2) the second signal is set indicating programming of configuration data on the programmable logic resource core circuitry has completed.

3. The programmable logic resource of claim 2 wherein the first signal, the second signal, and the reset signal are each generated from the programmable logic resource core circuitry.

4. The programmable logic resource of claim 2 wherein the first circuitry further comprises combinatorial logic coupled to receive the output of the control logic and is operative to send as output the plurality of reset signals.

5. The programmable logic resource of claim 1 wherein each of the plurality of pairs of reset signals comprises a transmitter reset signal and a receiver reset signal.

6. The programmable logic resource of claim 1 wherein, for each of the plurality of channels, the second circuitry comprises:
   a first synchronizer that receives as input a first signal from the pair of reset signals and is operative to output the first signal at a beginning of a clock cycle for a first clock; and a second synchronizer that receives as input a second signal from the pair of reset signals and is operative to output the second signal at a beginning of a clock cycle for a second clock.

7. The programmable logic resource of claim 6 wherein:
the first synchronizer comprises a first flip-flop and a second flip-flop, wherein the output of the first flip-flop is sent as input to the second flip-flop; and
the second synchronizer comprises a third flip-flop and a fourth flip-flop, wherein the output of the third flip-flop is sent as input to the fourth flip-flop.

8. The programmable logic resource of claim 6 wherein the first clock and the second clock are the same.

9. The programmable logic resource of claim 6 wherein the first clock and the second clock are different.

10. A digital signal processing system comprising:
processing circuitry;
a memory coupled to the processing circuitry; and
a programmable logic resource as defined in claim 1 coupled to the processing circuitry and the memory.

11. A printed circuit board on which is mounted a programmable logic resource as defined in claim 1.

12. The printed circuit board defined in claim 11 further comprising:
a memory mounted on the printed circuit board and coupled to the programmable logic resource.

13. The printed circuit board defined in claim 11 further comprising:
processing circuitry mounted on the printed circuit board and coupled to the programmable logic resource.

14. A programmable logic resource having programmable logic resource circuitry that provides a reset signal to an intellectual property block that supports a multi-channel input/output protocol comprising:
control logic that receives as input a first signal, a second signal, and the reset signal, and is operative to send as output the reset signal when (1) the first signal is set indicating a supply voltage on the programmable logic resource circuitry has reached a predetermined voltage level and (2) the second signal is set indicating programming of configuration data on the programmable logic resource core circuitry has completed; and
combinatorial logic coupled to receive the output of the control logic and is operative to send as output a plurality of pairs of reset signals, wherein each of the plurality of pairs of reset signals is associated with one of a plurality of channels in the intellectual property block.

15. The programmable logic resource of claim 14 wherein each of the plurality of channels comprises circuitry operative to receive one of the plurality of pairs of reset signals and to synchronize the plurality of pairs of reset signals for output in a respective one of the plurality of channels.

16. The programmable logic resource of claim 15 wherein, for each of the plurality of channels, the circuitry comprises:
a first synchronizer that receives as input a first signal from the pair of reset signals and is operative to output the first signal at a beginning of a clock cycle for a first clock; and
a second synchronizer that receives as input a second signal from the pair of reset signals and is operative to output the second signal at a beginning of a clock cycle for a second clock.

17. The programmable logic resource of claim 16 wherein:
the first synchronizer comprises a first flip-flop and a second flip-flop, wherein the output of the first flip-flop is sent as input to the second flip-flop; and
the second synchronizer comprises a third flip-flop and a fourth flip-flop, wherein the output of the third flip-flop is sent as input to the fourth flip-flop.

18. The programmable logic resource of claim 16 wherein the first clock and the second clock are the same.

19. The programmable logic resource of claim 16 wherein the first clock and the second clock are different.

20. The programmable logic resource of claim 14 wherein each of the plurality of pairs of reset signals comprises a transmitter reset signal and a receiver reset signal.

21. A method for providing, in a programmable logic resource, a reset signal to an intellectual property block that supports a multi-channel input/output protocol comprising:
receiving the reset signal from programmable logic resource core circuitry;
generating a plurality of pairs of reset signals based on the reset signal;
routing each of the plurality of pairs of reset signals to a respective one of a plurality of channels in the intellectual property block; and
synchronizing the plurality of pairs of reset signals for output within each respective one of the plurality of channels.

22. The method of claim 21 wherein receiving the reset signal from the programmable logic resource core circuitry further comprises receiving the reset signal when (1) a first signal is set indicating a supply voltage on the programmable logic resource core circuitry has reached a predetermined voltage level and (2) a second signal is set indicating programming of configuration data on the programmable logic resource core circuitry has completed.

23. The method of claim 21 wherein
each of the plurality of pairs of reset signals comprises a transmitter reset signal and a receiver reset signal.

24. The method of claim 21 wherein, for each of the plurality of channels, synchronizing the plurality of pairs of reset signals further comprises:
sending as output a first signal from the pair of reset signals at a beginning of a clock cycle for a first clock; and
sending as output a second signal from the pair of reset signals at a beginning of a clock cycle for a second clock.

25. The method of claim 21 wherein, for each of the plurality of channels, synchronizing the plurality of pairs of reset signals further comprises synchronizing each signal in the pair of reset signals with a same clock.

26. The method of claim 21 wherein, for each of the plurality of channels, synchronizing the plurality of pairs of reset signals further comprises synchronizing each signal in the pair of reset signals with a different clock.

* * * * *